(12) United States Patent
Lim et al.

(10) Patent No.: US 9,417,143 B2
(45) Date of Patent: Aug. 16, 2016

(54) APPARATUS AND METHOD FOR MEASURING BENDING OF AN OBJECT, BY USING AN OPTICAL WAVEGUIDE

(71) Applicant: Samsung Electronics Co., Ltd., Suwon-si (KR)

(72) Inventors: Soo Chul Lim, Seoul (KR); Joon Ah Park, Seoul (KR); Hyun Jeong Lee, Hwaseong-si (KR); Seung Ju Han, Seoul (KR); Kyung Won Moon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 14/199,081

(22) Filed: Mar. 6, 2014

(65) Prior Publication Data

US 2014/0334767 A1 Nov. 13, 2014

(30) Foreign Application Priority Data

May 13, 2013 (KR) ........................ 10-2013-0053821

(51) Int. Cl.
| | |
|---|---|
| *G01D 5/353* | (2006.01) |
| *G01L 1/24* | (2006.01) |
| *G06F 3/041* | (2006.01) |
| *G06F 3/042* | (2006.01) |
| *G01L 5/10* | (2006.01) |

(52) U.S. Cl.
CPC .............. *G01L 1/246* (2013.01); *G06F 3/0414* (2013.01); *G06F 3/0421* (2013.01); *G01L 5/105* (2013.01)

(58) Field of Classification Search
CPC .......... G01L 1/246; G01L 5/105; G02F 3/042
USPC ................................................ 385/16–24, 13
See application file for complete search history.

(56) References Cited

U.S. PATENT DOCUMENTS

| | | | |
|---|---|---|---|
| 5,684,297 A | 11/1997 | Tardy | |
| 7,683,890 B2 * | 3/2010 | Geaghan | G06F 3/041 178/18.01 |
| 8,705,020 B2 * | 4/2014 | Zhuang | G01D 5/35361 356/73.1 |
| 2006/0051022 A1 * | 3/2006 | Levner | G02B 5/1828 385/37 |
| 2007/0258674 A1 | 11/2007 | Wang et al. | |
| 2015/0116260 A1 * | 4/2015 | Hoen | G06F 3/0414 345/174 |
| 2015/0303496 A1 * | 10/2015 | Nakamoto | H01M 8/0432 429/414 |

FOREIGN PATENT DOCUMENTS

| | | |
|---|---|---|
| JP | 2003-500654 | 1/2003 |
| JP | 2004-506869 | 3/2004 |
| KR | 10-2011-0092611 | 8/2011 |
| KR | 10-2011-0092614 | 8/2011 |
| KR | 10-2012-0065925 | 6/2012 |

OTHER PUBLICATIONS

X. Chen et al., "Optical bend sensor for vector curvature measurement based on Bragg grating in eccentric core polymer optical fibre", 20th International Conference on Optical Fibre Sensors, Proc. of SPIE vol. 7503, 750327-1, 2009, 4 pages.
Timothée Boitouzet et al., "Fiber Optic Bend Sensors", Crafting Material Interfaces, Oct. 2011, URL http://material.media.mit.edu/?p=750.

* cited by examiner

*Primary Examiner* — Akm Enayet Ullah
(74) *Attorney, Agent, or Firm* — NSIP Law

(57) ABSTRACT

An apparatus and method for measuring bending of an object, a position of an item touching the object, and a shearing force of the item using an optical waveguide may include a frequency measurer to measure a frequency of light reflected from a grating of an optical waveguide, and a bending measurer to determine bending of an object to which the optical waveguide is attached using the frequency.

12 Claims, 12 Drawing Sheets

APPARATUS AND METHOD FOR MEASURING BENDING OF AN OBJECT, BY USING AN OPTICAL WAVEGUIDE

CROSS-REFERENCE TO RELATED APPLICATIONS

This application claims the priority benefit of Korean Patent Application No. 10-2013-0053821, filed on May 13, 2013, in the Korean Intellectual Property Office, the disclosure of which is incorporated herein by reference.

BACKGROUND

1. Field

The following description relates to an apparatus and method for measuring bending and touch using an optical waveguide, and more particularly, to an apparatus and method for measuring bending of an object to which an optical waveguide is attached, or a position and a shearing force of a item touching the object, using a frequency of light reflected from grating of the optical waveguide.

2. Description of the Related Art

Recently, a touch input method is widely used, which enables input of data by touching a screen without a dedicated input tool.

A touch input device included in conventional mobile phones or mobile terminals detects a touch between the screen and a human hand or pen or measures a vertical pressure applied to the screen, and uses a measurement result as input data.

However, because the conventional touch input device measures only the vertical pressure, reliability of a shearing force measured with respect to an object moving horizontally is relatively low.

In addition, when a flexible display capable of bending is used, bending and a bending degree of the flexible display may not be detected by only measurement of the vertical pressure.

Accordingly, there is a need for a measuring apparatus for measuring bending of a display and a shearing force of an item touching the display.

SUMMARY

The foregoing and/or other aspects are achieved by providing a measuring apparatus including a frequency measurer to measure a frequency of light reflected from a grating of an optical waveguide, and a bending measurer to determine bending of an object to which the optical waveguide is attached using the frequency.

The bending measurer may determine that bending has occurred at the object in an expansion direction of the optical waveguide when the frequency is increased.

The bending measurer may determine that bending has occurred at the object in a contraction direction of the optical waveguide when the frequency is decreased.

When a part of the frequency of light reflected from the grating grooves is changed, the bending measurer may identify a position of a grating groove corresponding to the changed frequency, and determine that bending has occurred at the identified position.

The bending measurer may determine a degree of bending based on a change degree of the frequency.

The measuring apparatus may further include a position and shearing measurer to determine a position and a shearing force of an item touching the optical waveguide using the frequency.

The foregoing and/or other aspects are also achieved by providing a measuring apparatus including a frequency measurer to measure frequency of light reflected from a grating of an optical waveguide, and a position and shearing measurer to determine a position and a shearing force of an item touching the optical waveguide using the frequency.

The position and shearing measurer may identify a position of a grating groove corresponding to a changed frequency when the frequency is changed, and determine that the item touches the object at the identified position.

The position and shearing measurer may determine the shearing force of the item based on a change direction of at least one frequency when at least one of the frequencies are changed.

The foregoing and/or other aspects are also achieved by providing a measuring method including measuring a frequency of light reflected from a grating of an optical waveguide, and measuring bending of an object to which the optical waveguide is attached, using the frequency.

The foregoing and/or other aspects are also achieved by providing a measuring method comprising measuring a frequency of light reflected from a grating of an optical waveguide, and measuring a position and shearing force of a item touching the optical waveguide using the frequency.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
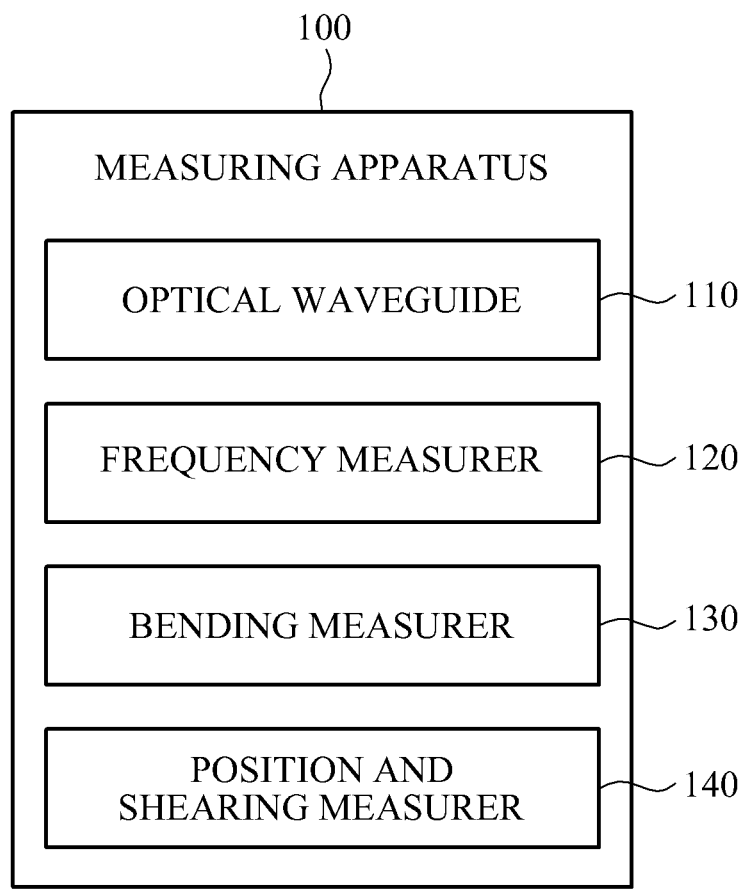
FIG. 1 illustrates a configuration of a measuring apparatus according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates a configuration of a measuring apparatus 100 according to example embodiments.

Referring to FIG. 1, the measuring apparatus 100 may include an optical waveguide 110, a frequency measurer 120, a bending measurer 130, and a position and shearing measurer 140.

The optical waveguide 110 may include a Bragg grating array, for example. When an optical wavelength of a wide band, passing through the optical waveguide 110, comes into contact with grating of the optical waveguide 110, light of a particular frequency may be reflected from the grating. A frequency of the light reflected by the grating may be varied according to an interval of grating grooves of the grating.

The optical waveguide 110 may be a polymer-based optical waveguide included in a flexible film capable of being bent or deformed by an external pressure. For example, the flexible film may include a polymer such as polydimethylsiloxane (PDMS) or fluorinated poly (arylene ether) (FPAE).

When the flexible film including the optical waveguide 110 is bent or pressurized, the optical waveguide 110 may also be bent or pressurized, and therefore, the interval of the grating grooves formed at the optical waveguide 110 may be changed. Accordingly, when the flexible film including the optical waveguide 110 is bent or pressurized, a frequency of light reflected from the respective grating grooves of the optical waveguide 110 may also be changed.

Here, the grating of the optical waveguide 110 may include pluralities of grating grooves arranged in a first direction and a second direction, such as a vertical direction and a horizontal direction, for example. The frequency of the light reflected from the grating grooves may be determined by the positions of the individual grating grooves. However, the disclosure is not limited thereto. For example, the pluralities of grating grooves may be arranged in any direction or directions that allow a position to be determined, such as in a diagonal direction, for example.

A configuration of the optical waveguide 110 will be described in detail with reference to FIG. 2.

The frequency measurer 120 may measure the frequency of the light reflected from the grating grooves of the optical waveguide 110.

The bending measurer 130 may determine bending of the object to which the optical waveguide 110 is attached, using the frequency being measured. For example, the object may be a flexible display capable of bending.

In detail, when the frequency measured by the frequency measurer 120 is increased, the bending measurer 130 may determine that bending has occurred at the object in an expanding direction of the optical waveguide 110.

Operation of when the bending occurs at the object in the expanding direction of the optical waveguide 110 will be described in detail with reference to FIG. 4.

When the frequency measured by the frequency measurer 120 is decreased, the bending measurer 130 may determine that bending has occurred at the object in a contracting direction of the optical waveguide 110.

Operation of when the bending occurs at the object in the contracting direction of the optical waveguide 110 will be described in detail with reference to FIG. 3.

When a portion of the frequency of the light reflected from the grating grooves is changed, the bending measurer 130 may identify a position of the grating grooves corresponding to the changed frequency and determine that bending has occurred at the identified position.

Operation of when a portion of the optical waveguide 110 is bent will be described in detail with reference to FIG. 5.

Here, the bending measurer 130 may determine a degree of bending of the object based on a change in a degree of the frequency measured by the frequency measurer 120. For example, when the frequency measured by the frequency measurer 120 is changed by a relatively large degree, the bending measurer 130 may determine that the object is bent by a large degree.

The position and shearing measurer 140 may determine a position and a shearing force of an item touching the optical waveguide 110, using the frequency measured by the frequency measurer 120.

When the change in a degree of the frequency measured by the frequency measurer 120 is not greater than a threshold, the position and shearing measurer 140 may determine that the frequency change is caused not by bending of the object, but by an item touching the optical waveguide 110 coupled with the object.

Therefore, when the change in a degree is not greater than the threshold, the position and shearing measurer 140 may identify the position of the grating groove corresponding to the changed frequency and determine that the item touches the optical waveguide coupled with the object at the identified position.

A process of measuring a position of the item touching the optical waveguide 110 by the position and shearing measurer 140 will be described in detail with reference to FIG. 10.

Here, the position and shearing measurer 140 may determine the shearing force of the item based on a change direction of the frequency measured by the frequency measurer 120. The shearing force of the item may refer to a force applied horizontally toward the optical waveguide 110 by the item touching the optical waveguide 110. For example, the shearing force may be one of a force generated in a particular direction when the item is moved in the particular direction and a force applied by the item in an unmoving state.

A process of measuring the shearing force of the item touching the optical waveguide 110 by the position and shearing measurer 140 will be described in detail with reference to FIG. 9.

Figure 2:
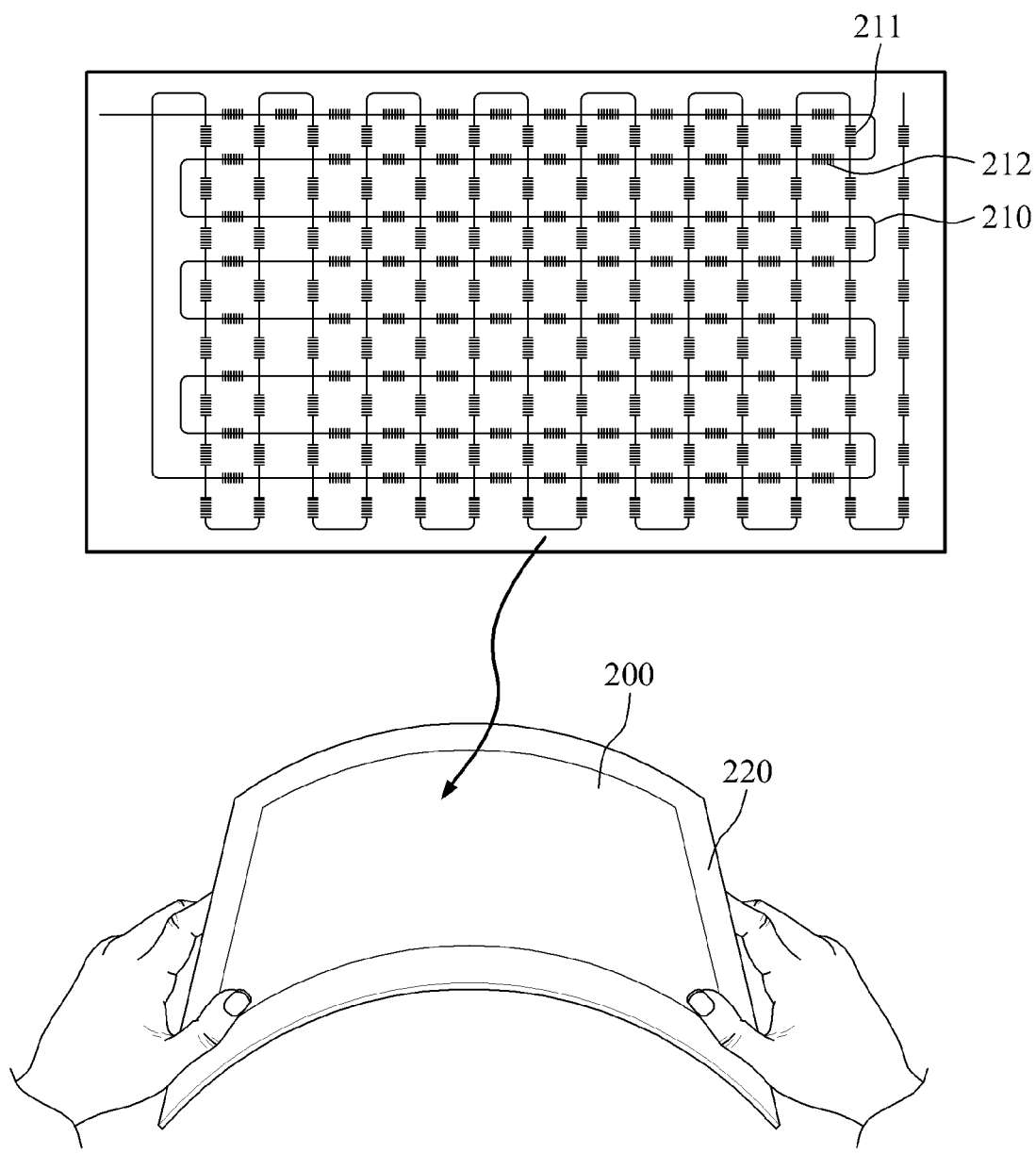
FIG. 2 illustrates an object to which an optical waveguide is attached, according to example embodiments.

FIG. 2 illustrates an object to which an optical waveguide 210 is attached, according to example embodiments.

The optical waveguide 210 according to the example embodiments may be included in a flexible film 200 as shown in FIG. 2.

The optical waveguide 210 may include a plurality of grating grooves 211 arranged in a vertical direction of the flexible film 200 and a plurality of grating grooves 212 arranged in a horizontal direction of the flexible film 200.

The flexible film 200 may be transparent, but is not limited thereto. The transparent flexible film 200 may be attached to a flexible display 220 capable of bending to be used as an input device of the flexible display 220.

The measuring apparatus 100 may determine at least one of a touch input, a bending input, and an input using a shearing force, that is, a shearing force input, of a user, using the grating 211 or a frequency of light reflected from the grating 212.

In detail, when the frequency change is smaller than a predetermined threshold, the measuring apparatus 100 may determine that the user makes the touch input or the shearing force input, and determine a position touched by the user or a position and direction of the shearing force input, using the position of the grating groove corresponding to the changed frequency.

When the frequency change is greater than the predetermined threshold, the measuring apparatus 100 may determine that the user makes the bending input, and determine a direction and degree of the bending of the flexible display 200 according to a direction and degree of the frequency change of the light.

Figure 3:
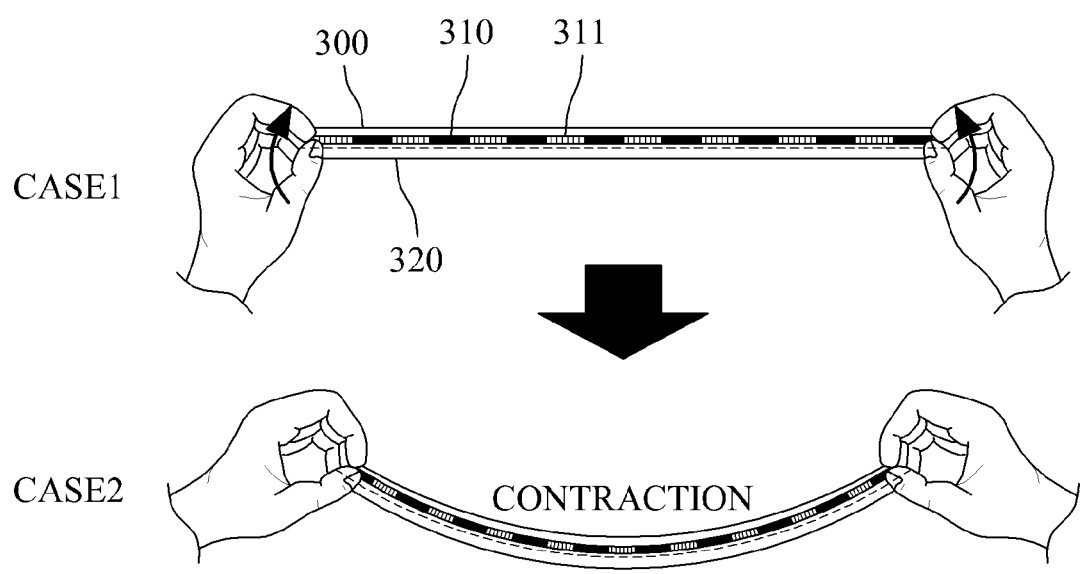
FIG. 3 illustrates a state change of an optical waveguide in a case in which a flexible display to which the optical waveguide is attached is bent downward, according to example embodiments.

FIG. 3 illustrates a state change of an optical waveguide 310 in a case in which a flexible display 320 to which the optical waveguide 310 is attached is bent downward, according to example embodiments.

As in Case 1, a flexible film 300 including the optical waveguide 310 may be attached to an upper surface of the flexible display 320. A plurality of grating grooves 311 included in the optical waveguide 310 may reflect light of different frequency bands, respectively.

When the flexible display 320 is bent downward as in Case 2, the grating grooves 311 of the optical waveguide 310 may be provided with a pressurizing force. Therefore, intervals of the grating grooves 311 of the optical waveguide 310 may be reduced in comparison to intervals of Case 1. Also, the frequency reflected by the grating grooves 311 may be reduced according to the reduction in the intervals of the grating grooves 311.

When a frequency measured by the frequency measurer 120 in Case 2 is smaller than a frequency measured by the frequency measurer 120 in Case 1, the bending measurer 130 of the measuring apparatus 100 may determine that bending has occurred in a contracting direction of the optical waveguide 310. Here, because the contracting direction of the optical waveguide 310 is opposite to a direction in which the flexible film 300 is attached as shown in FIG. 3, the bending measurer 130 may determine that the flexible display 320 is bent in an opposite direction to the direction in which the flexible film 300 is attached.

In addition, the bending measurer 130 may calculate a difference between the frequency measured by the frequency measurer 120 in Case 1 and the frequency measured by the frequency measurer 120 in Case 2, and determine the bending degree of the flexible display 320 based on the calculated difference.

Figure 4:
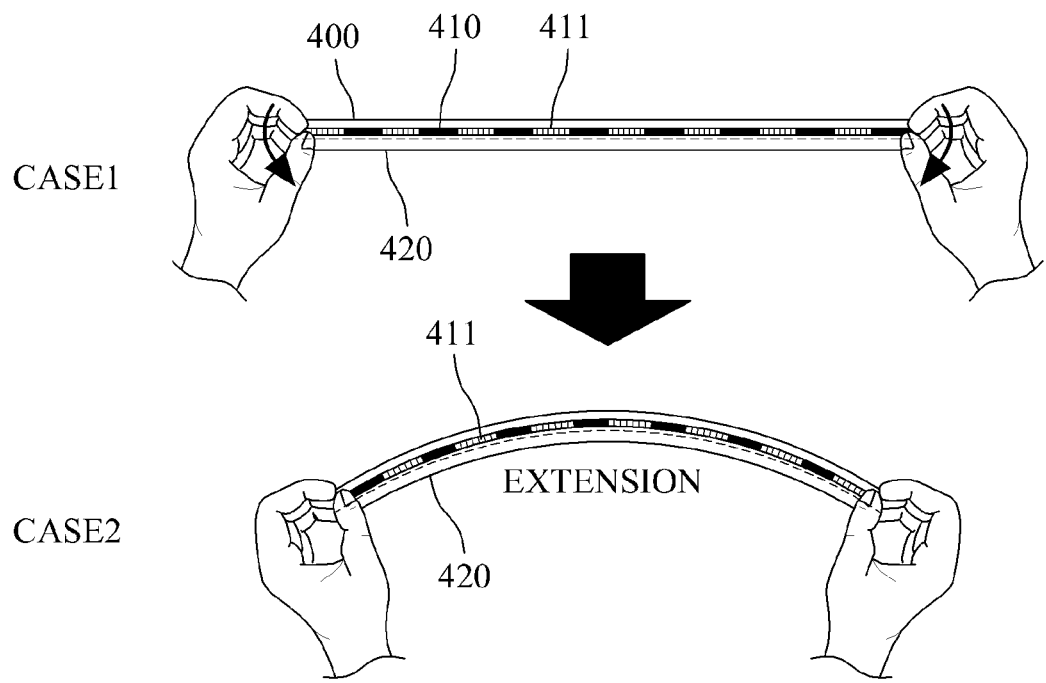
FIG. 4 illustrates a state change of an optical waveguide in a case in which a flexible display to which an optical waveguide is attached is bent upward, according to example embodiments.

FIG. 4 illustrates a state change of an optical waveguide 410 in a case in which a flexible display 420 to which an optical waveguide 410 is attached is bent upward, according to example embodiments.

As shown in Case 1, a flexible film 400 including the optical waveguide 410 may be attached to an upper surface of the flexible display 420 capable of bending. A plurality of grating grooves 411 included in the optical waveguide 410 may reflect light of different frequency bands, respectively.

When the flexible display 420 is bent upward as in Case 2, the grating grooves 411 of the optical waveguide 410 may be applied with an expanding force. Therefore, intervals of the grating grooves 411 may be increased in comparison to intervals of Case 1. Also, the frequency reflected by the grating grooves 411 may be increased according to the reduction in the intervals of the grating grooves 411.

When the frequency measured by the frequency measurer 120 in Case 2 is greater than the frequency measured by the frequency measurer 120 in Case 1, the bending measurer 130 of the measuring apparatus 100 may determine that bending has occurred in an expanding direction of the optical waveguide 410. Here, because the expanding direction of the optical waveguide 410 corresponds to the direction in which the flexible film 400 is attached as shown in FIG. 4, the bending measurer 130 may determine that the flexible display 420 is bent in the direction in which the flexible film 400 is attached.

In addition, the bending measurer 130 may calculate a difference between the frequency measured by the frequency measurer 120 in Case 1 and the frequency measured by the frequency measurer 120 in Case 2, and determine the bending degree of the flexible display 420 based on the calculated difference.

Figure 5:
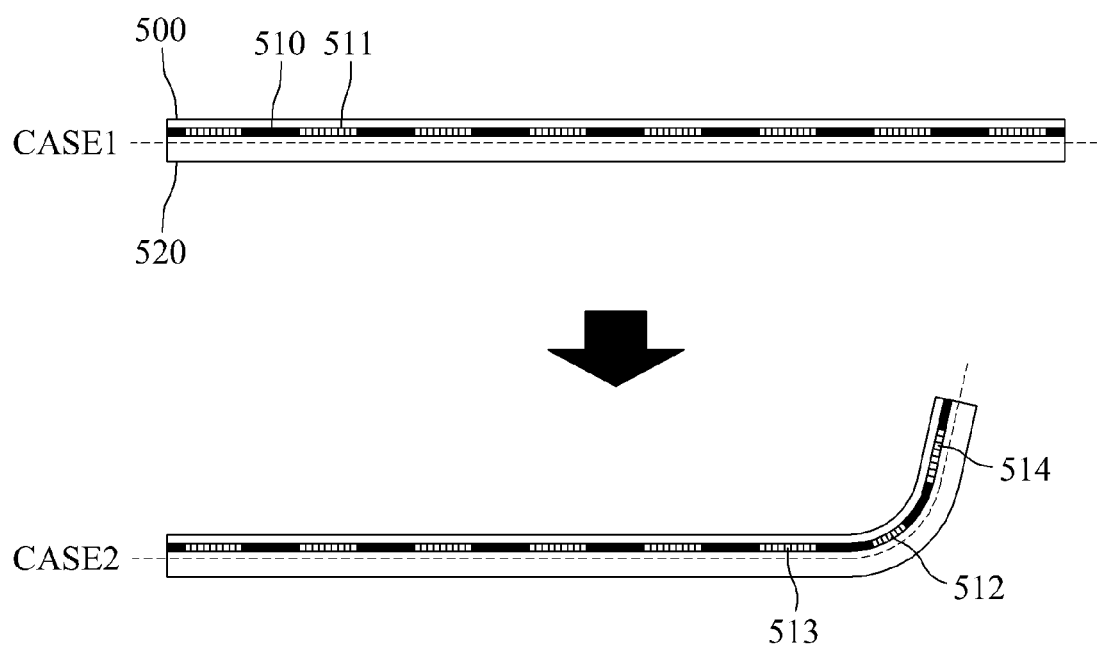
FIG. 5 illustrates a state change of an optical waveguide in a case in which a flexible display to which the optical waveguide is attached is partially bent, according to example embodiments.

FIG. 5 illustrates a state change of an optical waveguide 510 in a case in which a flexible display to which the optical waveguide 510 is attached is partially bent, according to example embodiments.

As shown in Case 1, a flexible film 500 including the optical waveguide 510 may be attached to an upper surface of the flexible display 520 capable of bending. A plurality of grating grooves 511 included in the optical waveguide 510 may reflect light of different frequency bands, respectively.

When the flexible display 520 is partially bent as in Case 2, a portion of the grating grooves 511 of the optical waveguide 510 may be expanded or contracted. In detail, a grating groove 512 may be contracted by bending of the flexible display 520 while neighboring grating grooves 513 and 514 are not contracted.

Here, out of the frequency measured by the frequency measurer 120, a frequency of a band corresponding to the grating groove 512 may be changed. Therefore, the bending measurer 130 may identify a position of the grating groove 512, of which the frequency is changed, and determine that the flexible display 520 is bent at the position of the grating groove 512.

Also, the bending measurer 130 may determine a direction and degree of bending of the flexible display 520 by comparing the frequency measured by the frequency measurer 120 in Case 1 and the frequency measured by the frequency measurer 120 in Case 2.

Figure 6:
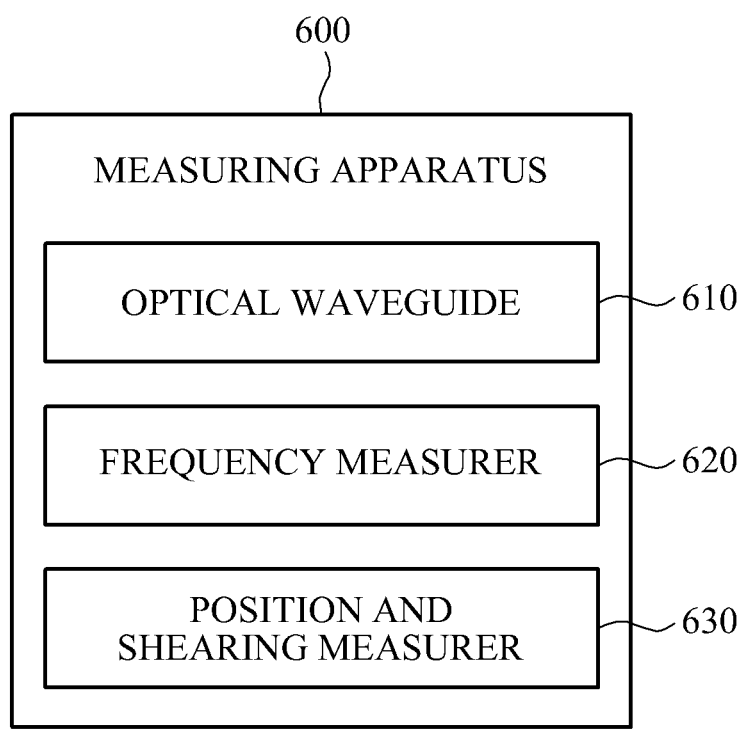
FIG. 6 illustrates a configuration of a measuring apparatus according to example embodiments.

FIG. 6 illustrates a configuration of a measuring apparatus 600 according to example embodiments.

FIG. 6 shows the configuration of the measuring apparatus 600 that measures a position and a shearing force of an item touching a device when a flexible film including an optical waveguide 610 is attached to the device which is not bendable, such as a general mobile device.

Referring to FIG. 6, the measuring apparatus 600 may include an optical waveguide 610, a frequency measurer 620, a bending measurer 630, and a position and shearing measurer 640.

The optical waveguide 610 may include a Bragg grating array, for example. When an optical wavelength of a wide band, passing through the optical waveguide 610, comes into contact with grating of the optical waveguide 610, light of a particular frequency may be reflected from the grating. A frequency of the light reflected by the grating may be varied according to an interval of grating grooves of the grating.

The optical waveguide 610 may be a polymer-based optical waveguide included in a flexible film capable of being bent or deformed by an external pressure. For example, the flexible film may include a polymer such as PDMS or FPAE.

When the flexible film including the optical waveguide 610 is pressurized, the optical waveguide 610 may also be pressurized and therefore the interval of the grating grooves formed at the optical waveguide 610 may be changed. Accordingly, when the flexible film including the optical waveguide 610 is pressurized, a frequency of light reflected from the respective grating grooves of the optical waveguide 610 may also be changed.

Here, the grating of the optical waveguide 610 may include pluralities of grating grooves arranged in a vertical direction and a horizontal direction. The frequency of the light reflected from the grating grooves may be determined by the positions of the individual grating grooves.

A configuration of the optical waveguide 610 will be described in detail with reference to FIG. 7.

The frequency measurer 620 may measure the frequency of the light reflected from the grating grooves of the optical waveguide 610.

The position and shearing measurer 630 may determine a position and a shearing force of the item touching the optical waveguide 610, using the frequency measured by the frequency measurer 620.

In detail, the position and shearing measurer 630 may check whether the frequency measured by the frequency measurer 620 is changed. In addition, when the frequency is changed, the position and shearing measurer 630 may identify a position of the grating groove corresponding to the changed frequency and determine that bending has occurred at the identified position.

A process of measuring the item touching the optical waveguide 610 by the position and shearing measurer 630 will be described in detail with reference to FIG. 10.

Also, the position and shearing measurer 630 may determine a shearing force of the item based on a change direction of the frequency measured by the frequency measurer 620.

In detail, when a frequency reflected from at least one of the grating grooves is reduced and a frequency reflected from at least one of the grating grooves is increased, the position and shearing measurer 630 may determine the shearing force of the item based on a position of a grating groove of which the frequency is reduced and a position of a grating groove of which the frequency is increased.

Here, the position and shearing measurer 630 may determine a direction from the grating groove of which the frequency is reduced to the grating groove of which the frequency is increased, as a direction of the shearing force.

The position and shearing measurer 630 may determine a degree of the shearing force of the item based on a decrease or an increase of the frequency at the grating groove.

A process of measuring the shearing force of the item touching the optical waveguide 610 by the position and shearing measurer 630 will be described in detail with reference to FIG. 9.

Figure 7:
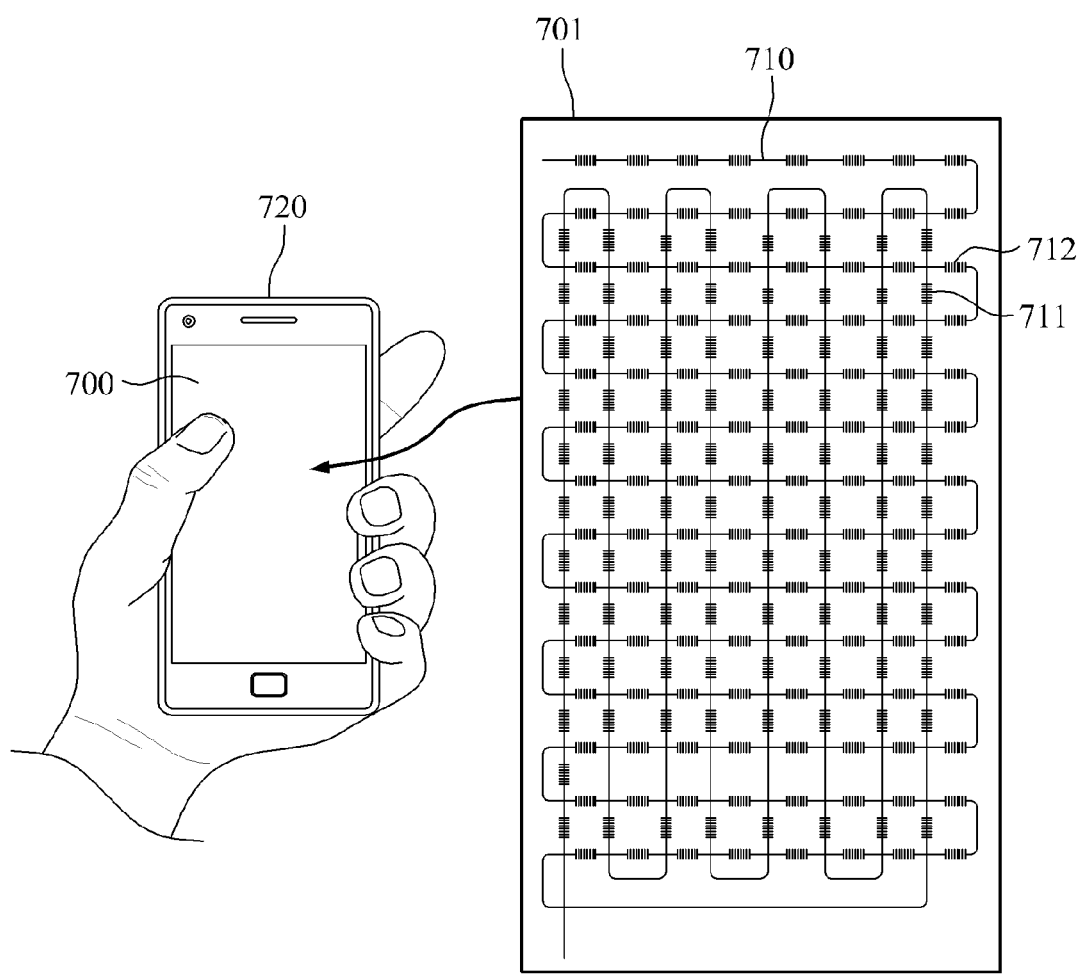
FIG. 7 illustrates an object to which an optical waveguide is attached according to example embodiments.

FIG. 7 illustrates an object to which an optical waveguide 710 is attached according to example embodiments.

As shown in FIG. 7, a flexible film 700 including the optical waveguide 710 may be attached to a display of a mobile apparatus 720. The flexible film 700 may be transparent and used as an input device using the display of the mobile apparatus 720.

The optical waveguide 710 may include a plurality of grating grooves 711 arranged in a vertical direction of the flexible film 700 and a plurality of grating grooves 712 arranged in a horizontal direction of the flexible film 700.

A measuring apparatus according to the example embodiments may determine at least one of a touch input of the user and an input using a shearing force, using a frequency of light reflected from the grating grooves 711 or the grating grooves 712.

In detail, when the frequency reflected from the grating grooves 711 or the grating grooves 712 is changed, the measuring apparatus 700 may determine a position touched by the user, or a direction and degree of the shearing force, using the positions of the grating grooves corresponding to the changed frequency.

Figure 8:
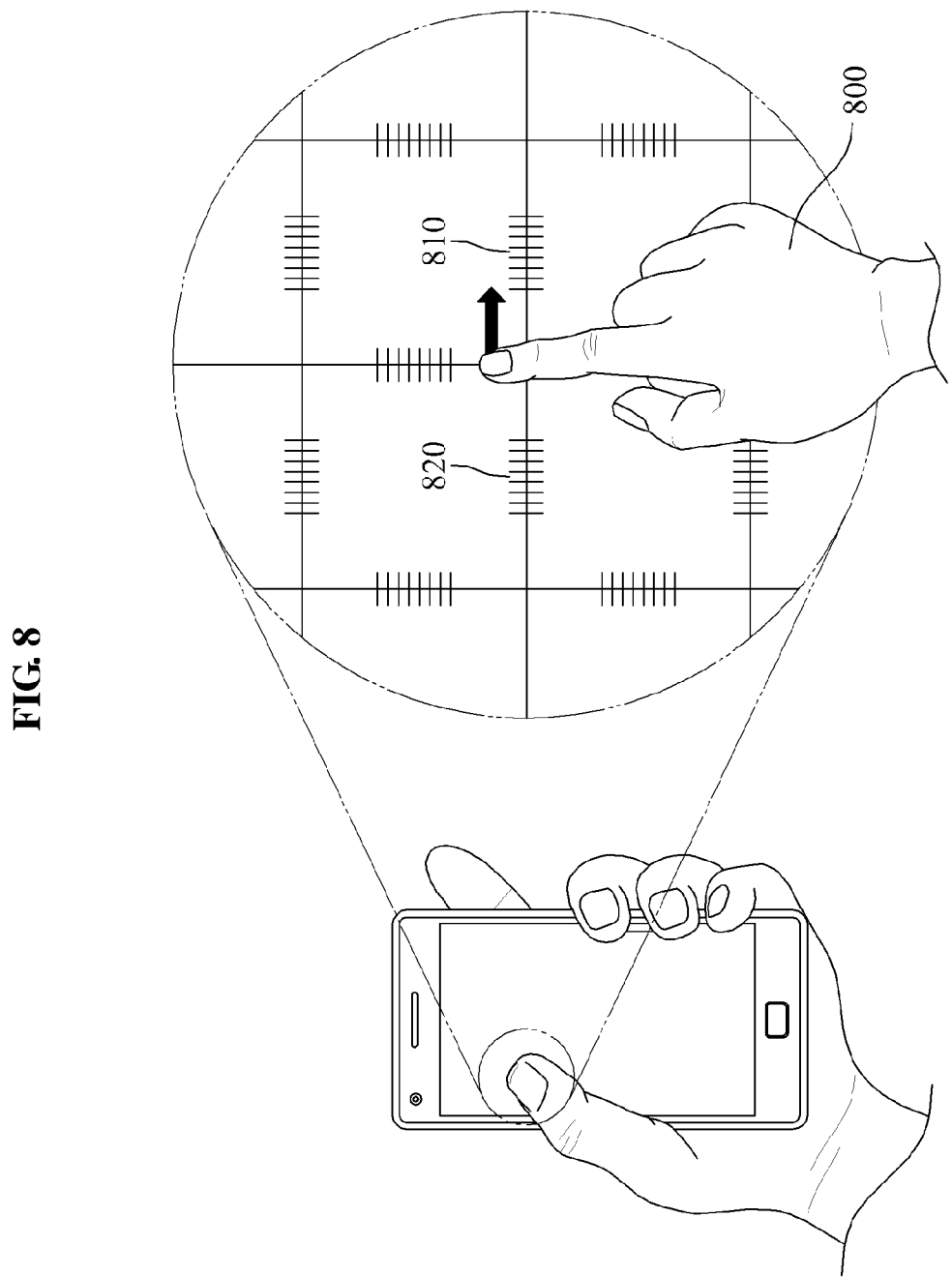
FIG. 8 illustrates an example of measuring a shearing force of an item touching an optical waveguide, according to example embodiments.

FIG. 8 illustrates an example of measuring a shearing force of an item touching an optical waveguide, according to example embodiments.

As shown in FIG. 8, the user may apply a force in a right direction with a finger 800 where the finger 800 touches a flexible film including the optical waveguide.

In this case, a frequency of a grating groove 810 disposed in a direction of applying the force may be reduced whereas a frequency of a grating groove 820 disposed in an opposite direction to the direction of applying the force may be increased.

Therefore, the position and shearing measurer 140 or the position and shearing measurer 630 may determine an input of a shearing force in a right direction from the finger 800 based on a frequency change of the grating groove 810 or the grating groove 820.

A frequency reduction degree of the grating groove 810 and a frequency increase degree of the grating groove 820 may be proportional to the force applied by the finger 800 by the user.

Therefore, the position and shearing measurer 140 or the position and shearing measurer 630 may determine a degree of the shearing force input by the finger 800 based on a degree of the frequency change of the grating groove 810 and the grating groove 820.

Figure 9:
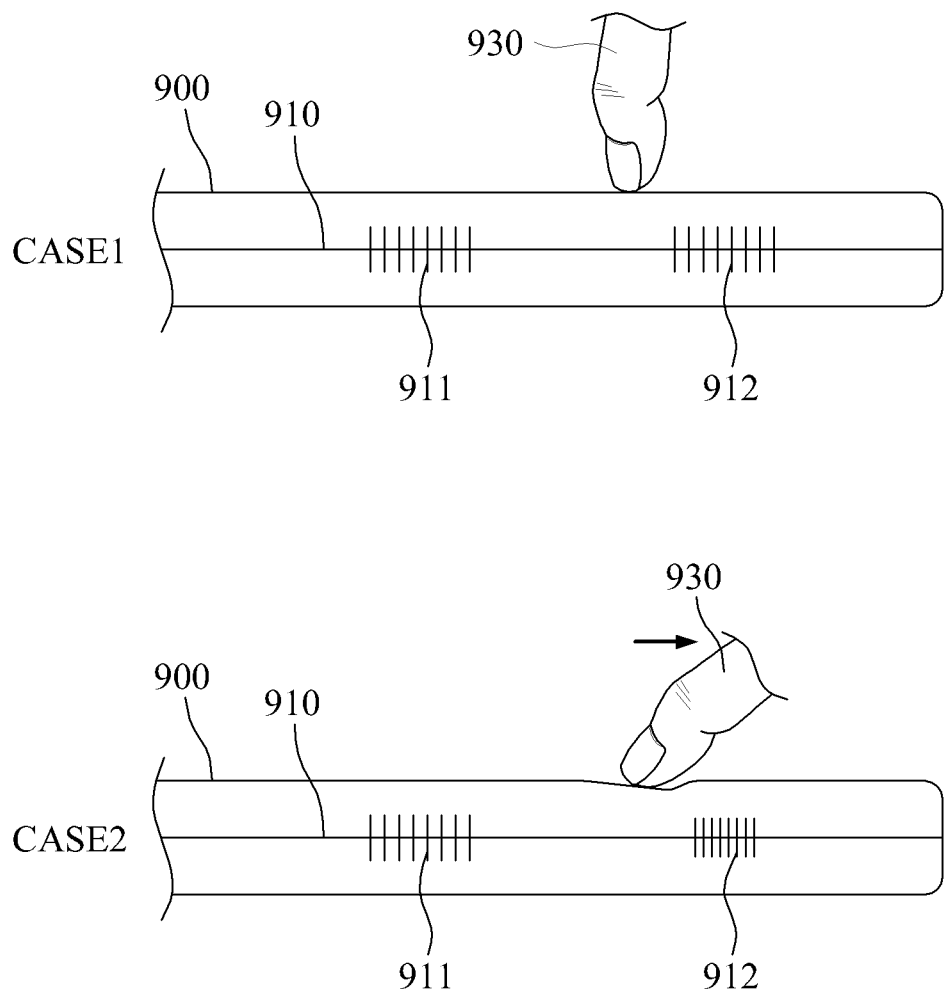
FIG. 9 illustrates a state change of an optical waveguide according to a shearing force of an item, according to example embodiments.

FIG. 9 illustrates a state change of an optical waveguide according to a shearing force of an item, according to example embodiments.

The user may bring a finger 930 into contact with a flexible film 900 including an optical waveguide 910 as shown in Case 1.

Additionally, the user may apply a force in a right direction where the finger 930 pushes the flexible film 900 as shown in Case 2. Here, because the flexible film 900 is pushed in a right direction, an area of the flexible film 900 disposed on the right of the finger 930 may be contracted while an area of the flexible film 900 disposed on the left of the finger 930 may be expanded.

Therefore, grating grooves 912 disposed on the right of the finger 930 may be applied with a contraction force as the area of the flexible film 900 disposed on the right of the finger 930 is contracted. Accordingly, intervals of the grating grooves 912 may be reduced in comparison to intervals of Case 1. Also, a frequency reflected from the grating grooves 912 may be reduced according to the reduction in the intervals of the grating grooves 912.

Because grating grooves 911 disposed on the left of the finger 930 are applied with an expansion force as the area of the flexible film 900 disposed on the left of the finger 930 is expanded, intervals of the grating grooves 911 may be increased in comparison to the intervals of Case 1. In addition, a frequency reflected from the grating grooves 911 may be increased according to the increase in the intervals of the grating grooves 911.

Therefore, when the frequency of the grating grooves 911 is increased and the frequency of the grating grooves 912 is reduced, the position and shearing measurer 140 or the position and shearing measurer 630 may determine that the finger 930 has input a shearing force in a direction from a position of the grating grooves 911 to a position of the grating grooves 912. In addition, the position and shearing measurer 140 or the position and shearing measurer 630 may determine a degree of the shearing force input by the finger 930 based on a degree of the frequency change of the grating grooves 911 and the grating grooves 912.

Figure 10:
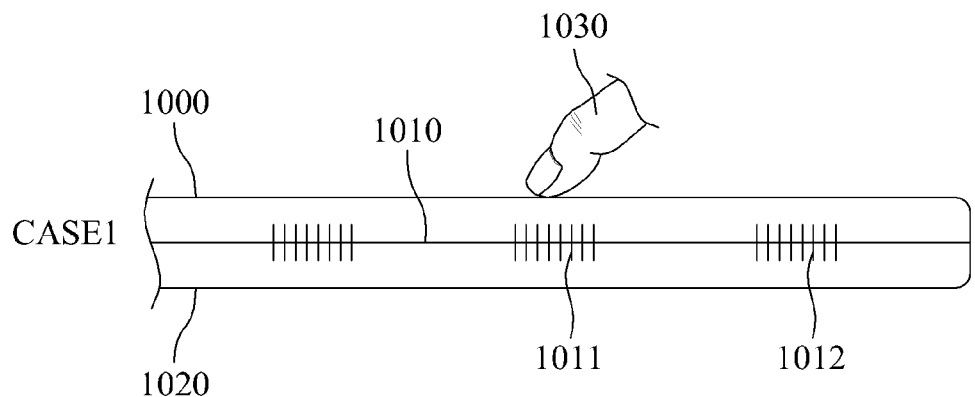
FIG. 10 illustrates a process of measuring a position of an item touching an optical waveguide, according to example embodiments.
Figure 10:
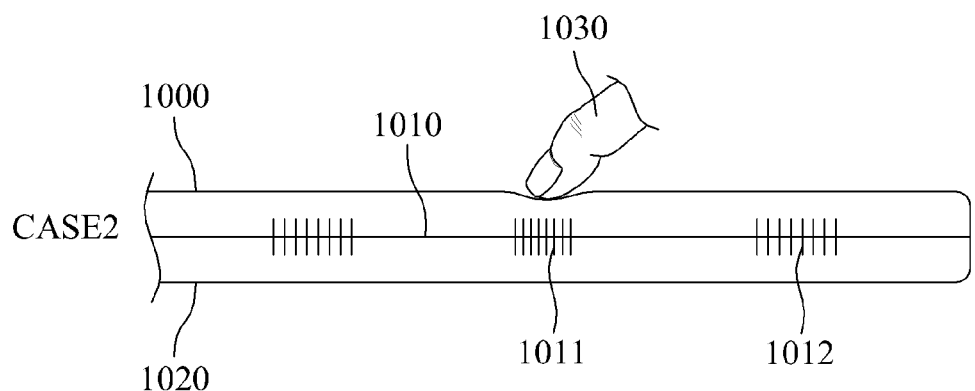
Figure 10:
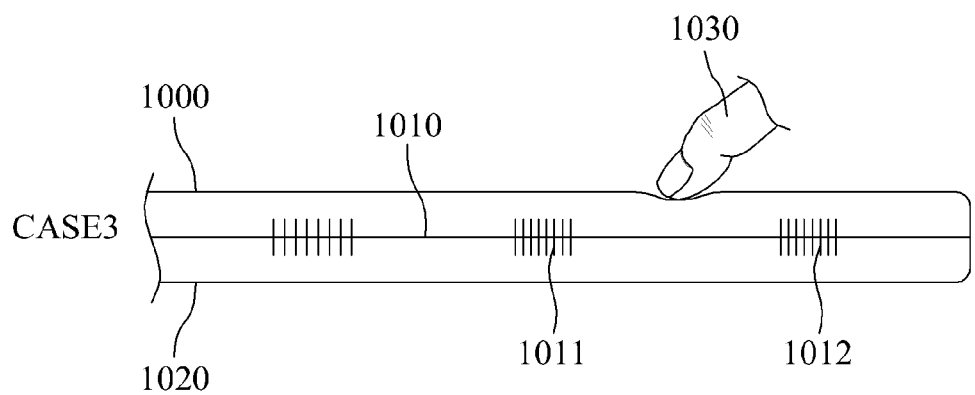

FIG. 10 illustrates a process of measuring a position of an item touching an optical waveguide, according to example embodiments.

The user may bring a finger 1030 into contact with a flexible film 1000 including an optical waveguide 1010 as shown in Case 1.

The user may push the flexible film 1000 by the finger 1030 as shown in Case 2. Here, an area of the flexible film 1000 corresponding to a position of the finger 1030 may be contracted by a pressure of the finger 1030.

Here, because grating grooves 1012 adjacent to the position of the finger 1030 are provided with a contraction force according to the contraction of the flexible film 1000, intervals of grating grooves 1011 may be reduced in comparison to intervals of Case 1. Frequency reflected from the grating grooves 1011 may also be reduced according to the reduction in the intervals of the grating grooves 1011.

The position and shearing measurer 140 or the position and shearing measurer 630 may identify the grating grooves 1011 of which the frequency is reduced and determine that the finger 1030 touches positions of the grating grooves 1011.

The user may push a position between the grating grooves 1011 and the grating grooves 1012 by the finger 1030 on the flexible film 1000 as shown in Case 3. The grating grooves 1011 and the grating grooves 1012 adjacent to the position of the finger 1030 may be contracted by the pressure of the finger 1030.

Accordingly, the intervals between the grating grooves 1011 and the grating grooves 1012 may be reduced in comparison to intervals of Case 1. Also, a frequency reflected from the grating grooves 1011 and the grating grooves 1012 may be reduced according to the reduction in the intervals of the grating grooves 1011 and the grating grooves 1012.

When the frequency of the grating grooves is reduced as in Case 3, the position and shearing measurer 140 or the position and shearing measurer 630 may identify the grating grooves of which the frequency is reduced, and determine that the finger 1030 has touched the position between the grating grooves 1011 and the grating grooves 1012.

Here, the position and shearing measurer 140 or the position and shearing measurer 630 may accurately determine the position of the finger 1030 according to a frequency reduction ratio. For example, when the frequency of the grating grooves 1011 and the frequency of the grating grooves 1012 are reduced by the same ratio, the position and shearing measurer 140 or the position and shearing measurer 630 may determine that the finger 1030 is disposed in the middle between the grating grooves 1011 and the grating groove 1012. When the frequency of the grating grooves 1011 is reduced more than the frequency of the grating grooves 1012, the position and shearing measurer 140 or the position and shearing measurer 630 may determine that the finger 1030 is disposed nearer to the grating grooves 1011 between the grating grooves 1011 and the grating grooves 1012.

Figure 11:
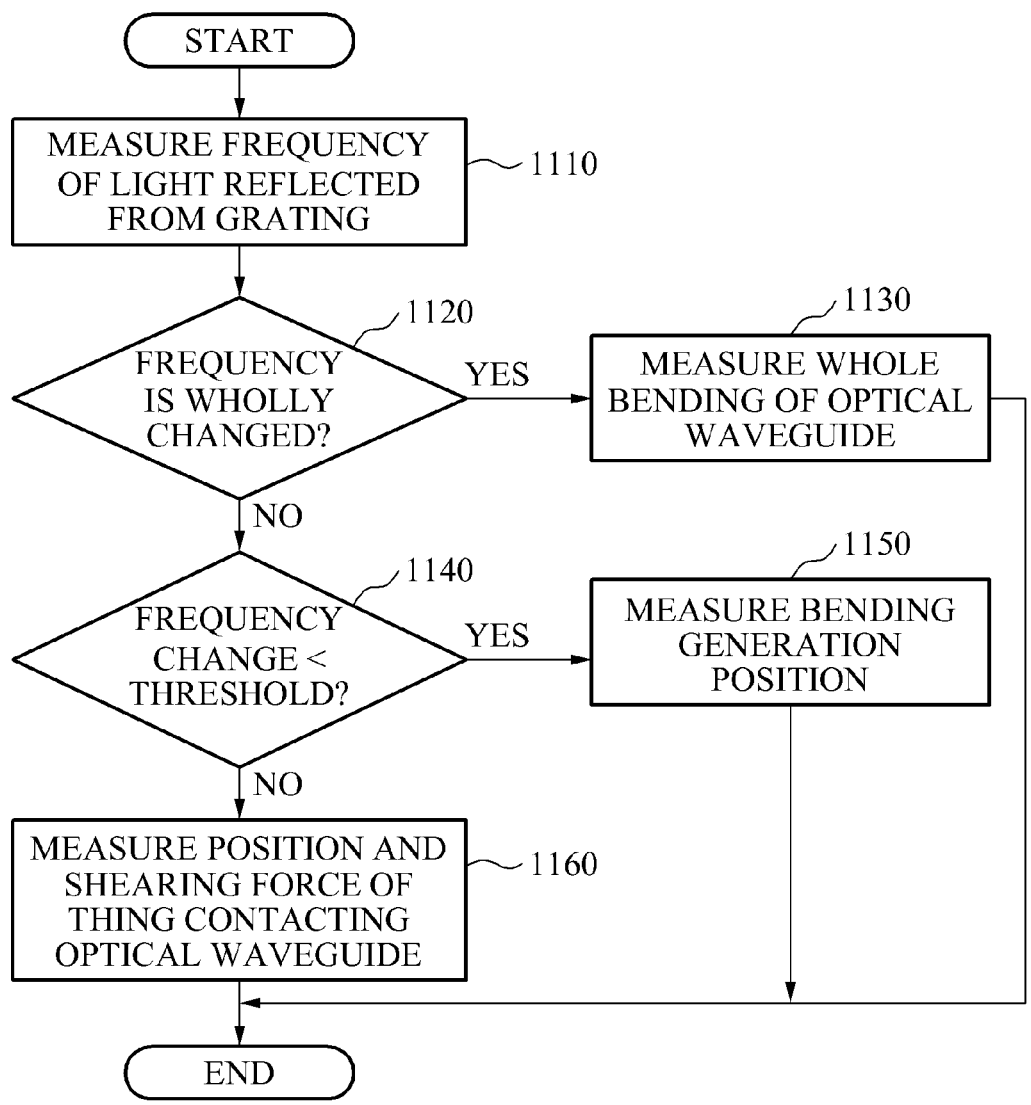
FIG. 11 illustrates a bending measurement method according to example embodiments.

FIG. 11 illustrates a bending measurement method according to example embodiments.

In operation 1110, a frequency measurer 120 may measure a frequency of light reflected from grating grooves of an optical waveguide.

In operation 1120, a bending measurer may check whether the frequency measured in operation 1110 is changed with respect to all the grating grooves.

When the frequency measured in operation 1110 is changed with respect to all the grating grooves, the bending measurer may determine a flexible film including the optical waveguide or an object to which the flexible film is attached is entirely bent, and may perform operation 1130.

When frequency corresponding to a part of the grating grooves is changed out of the frequency measured in operation 1110, the bending measurer may determine that the flexible film including the optical waveguide or the object to which the flexible film is attached is partially bent or receives a touch input, and may perform operation 1140.

In operation 1130, the bending measurer may determine bending of the flexible film as a whole, including the optical waveguide or the object to which the flexible film is attached.

In detail, when the frequency measured in operation 1110 is increased, the bending measurer may determine that bending has occurred at the object in an expanding direction of the optical waveguide.

When the frequency measured in operation 1110 is reduced, the bending measurer may determine that bending has occurred at the object in a contracting direction of the optical waveguide.

Based on a change degree of the frequency measured by the frequency measurer, the bending measurer may determine a degree of bending. For example, when the frequency measured by the frequency measurer is changed by a relatively large degree, the bending measurer may determine that the object is bent by a large degree.

In operation 1140, the bending measurer may check whether the change degree of the frequency measured in operation 1120 is smaller than a threshold.

Here, when the change degree of the frequency measured in operation 1120 is greater than or equal to the threshold, the position and shearing measurer may determine that the frequency change is caused by partial bending of the object and perform operation 1150.

When the change degree of the frequency measured in operation 1120 is not smaller than the threshold, the position and shearing measurer may determine that the frequency change is caused not by bending of the object but by an item touching the optical waveguide coupled with the object, and may perform operation 1160.

In operation 1150, the bending measurer may identify a position of grating grooves corresponding to the changed frequency out of the frequency measured in operation 1120 and determine that the bending is generated at the identified position.

In operation 1160, the position and shearing measurer may determine a position and a shearing force of the item touching the optical waveguide 110 using the frequency measured in operation 1120.

Here, the position and shearing measurer may determine the position of the item touching the object based on the frequency change measured in operation 1120. For example, the position and shearing measurer may identify a position of the grating groove corresponding to the changed frequency out of the frequency measured in operation 1120 and determine that the item touches the object at the identified position.

The position and shearing measurer may determine the shearing force of the item touching the object based on the frequency change measured in operation 1120. For example, when a frequency corresponding to a first grating groove among the grating grooves is increased and a frequency corresponding to a second grating groove is reduced, the position and shearing measurer may determine that the shearing force is input by the item touching the object, in a direction from the first grating groove to the second grating groove.

Figure 12:
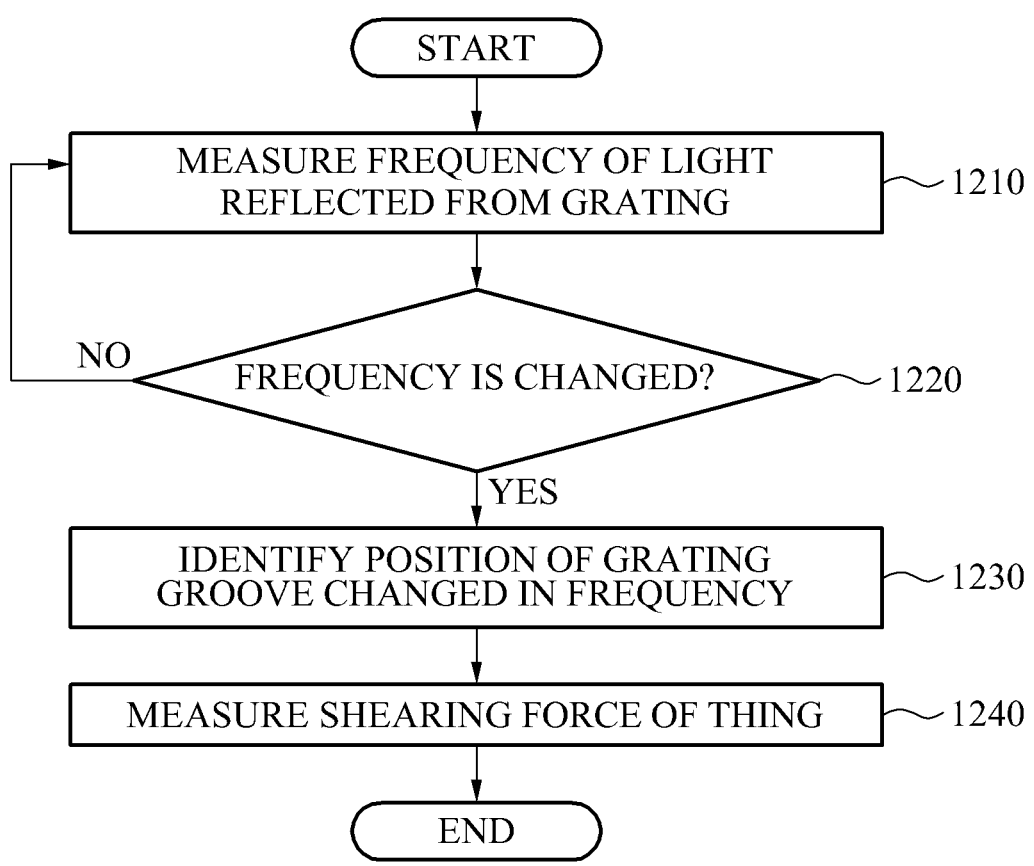
FIG. 12 illustrates a pressure measurement method according to example embodiments.

FIG. 12 illustrates a pressure measurement method according to example embodiments.

For example, FIG. 12 may illustrate a method of measuring a pressure of an item touching an object by the measuring apparatus shown in FIG. 6.

In operation 1210, the frequency measurer may determine frequency of light reflected from grating grooves of the optical waveguide.

In operation 1220, the position and shearing measurer may check whether any frequency is changed in amplitude among the frequency measured in operation 1210. When there is no frequency changed in amplitude, the frequency measurer may repeat operation 1210.

In operation 1230, the position and shearing measurer may determine a position of the item touching the object based on a change of the frequency checked in operation 1220. For example, the position and shearing measurer may identify a position of a grating groove corresponding to the changed frequency out of the frequency measured in operation 1210, and determine that the item touches the object at the identified position.

In operation 1240, the position and shearing measurer may determine the shearing force of the object based on a direction of the frequency change checked in operation 1220. For example, when a frequency corresponding to a first grating groove among the grating grooves is increased and a frequency corresponding to a second grating groove is reduced, the position and shearing measurer may determine that the shearing force is input by the item touching the object, in a direction from the first grating groove to the second grating groove.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A measuring apparatus comprising:
    a frequency measurer configured to measure a frequency of light reflected from a grating of an optical waveguide, wherein the grating comprises grating grooves; and
    a bending measurer configured to determine, by using the measured frequency, bending of an object to which the optical waveguide is attached,
    wherein when a portion of the measured frequency of light reflected from the grating grooves is changed, the bending measurer is configured to identify a position of a grating groove among the grating grooves corresponding to the changed frequency, and to determine that bending has occurred at the identified position.

2. The measuring apparatus of claim 1, wherein when the measured frequency is increased, the bending measurer is configured to determine that bending has occurred at the object in an expansion direction of the optical waveguide.

3. The measuring apparatus of claim 1, wherein when the measured frequency is decreased, the bending measurer is configured to determine that bending has occurred at the object in a contraction direction of the optical waveguide.

4. The measuring apparatus of claim 1, wherein the grating comprises first grating grooves arranged in a first direction and second grating grooves arranged in a second direction, and the frequency of light reflected from the first and/or second grating grooves is measured according to positions of the grating grooves.

5. The measuring apparatus of claim 1, wherein the bending measurer is configured to determine a degree of bending based on a change in a degree of the measured frequency.

6. The measuring apparatus of claim 1, further comprising a position and shearing measurer configured to determine, by using the measured frequency, a position and a shearing force of an item touching the optical waveguide.

7. The measuring apparatus of claim 6, wherein when a change in a degree of the measured frequency is smaller than or equal to a threshold, the position and shearing measurer is configured to identify a position of a grating groove corresponding to the changed frequency, and is configured to determine that the item touches the object at the identified position.

8. The measuring apparatus of claim 6, wherein the position and shearing measurer is configured to determine the shearing force of the item, based on a change in a direction of the measured frequency.

9. A measuring apparatus comprising:
    a frequency measurer configured to measure frequency of light reflected from a grating of an optical waveguide, wherein the grating comprises grating grooves; and
    a position and shearing measurer to determine, by using the measured frequency, a position and a shearing force of an item touching the optical waveguide,
    wherein when a portion of the measured frequency of light reflected from the grating grooves is changed, the position and shearing measurer is configured to identify a position of a grating groove among the grating grooves corresponding to the changed frequency, and to determine that bending has occurred at the identified position.

10. The measuring apparatus of claim 9, wherein when the measured frequency is changed, the position and shearing measurer is configured to identify a position of a grating groove corresponding to a changed frequency, and is configured to determine that the item touches the optical waveguide at the identified position.

11. The measuring apparatus of claim 9, wherein when a frequency reflected from at least one of the grating grooves is reduced and a frequency reflected from another of the grating grooves is increased, the position and shearing measurer is configured to determine the shearing force of the item, based on a position of the at least one of the grating grooves of which a frequency is reduced, and a position of the another of the grating grooves of which a frequency is increased.

12. The measuring apparatus of claim 11, wherein the position and shearing measurer is configured to determine, as a direction of the shearing force, a direction from the at least one of the grating grooves of which the frequency is reduced to the another of the grating grooves of which the frequency is increased.

\* \* \* \* \*